March 17, 1959 W. R. RUNYAN ET AL 2,878,152
GROWN JUNCTION TRANSISTORS
Filed Nov. 28, 1956
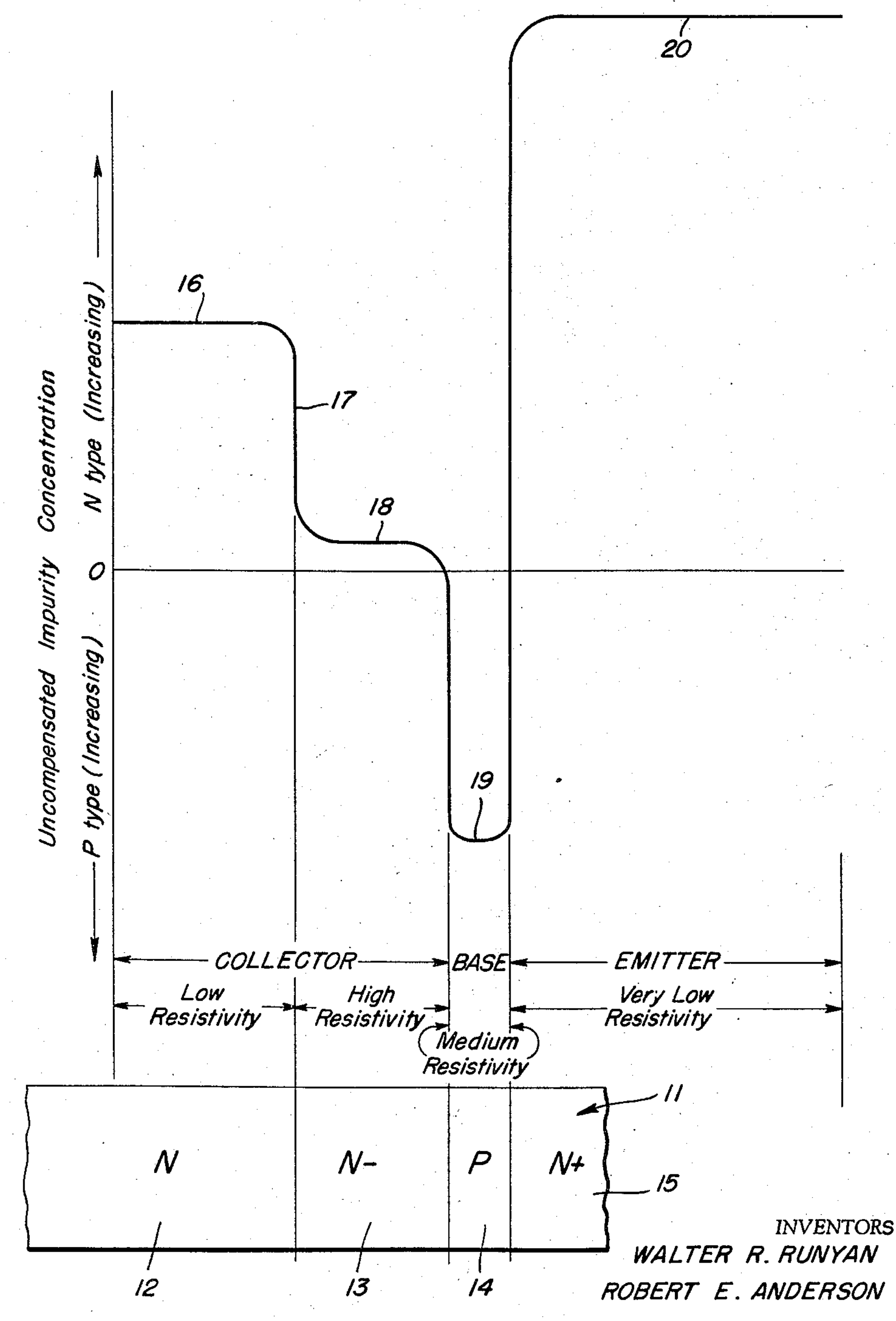
INVENTORS
WALTER R. RUNYAN
ROBERT E. ANDERSON
BY Stevens, Davis, Miller & Mosher
ATTORNEYS United States Patent Office 2,878,152
Patented Mar. 17, 1959

2,878,152

GROWN JUNCTION TRANSISTORS

Walter R. Runyan, Dallas, and Robert E. Anderson, Richardson, Tex., assignors to Texas Instruments Incorporated, Dallas, Tex., a corporation of Delaware Application November 28, 1956, Serial No. 624,781

4 Claims. (Cl. 148—33)

This invention relates to improvements in grown junction transistors, and particularly to improvements in the semiconductor crystal segment that lies at the heart of the device.

A typical grown junction transistor is comprised of a small bar of germanium or silicon about .030 by .030 inch in cross-section and about .25 inch in length. This small bar is cut from a larger crystal of silicon or germanium and the crystal is so grown that when the bar is properly cut therefrom, the end portions of the bar will be of one type (p or n) of electrical conductivity and a narrow layer extending transversely somewhere near the mid-point will be of the opposite type of electrical conductivity. Suitable electrical connections are then made to the intermediate layer and the two ends, and the device is mounted and appropriately enclosed.

In growing the crystal from which such semiconductor bars are to be cut, the custom is to add a very small amount of an impurity to the melted semiconductor material so that the first-grown part of the crystal will have the desired type of conductivity. Because this part of the crystal contains only a small amount of impurity, it is of relatively high resistivity. After the first part of the crystal has been grown, an impurity of a different type is added to the molten semiconductor material so as to cause the next part of the crystal to be grown to have the opposite type of conductivity. Only a thin layer of crystal of this type of conductivity is grown. Then a considerably larger amount of an impurity is added to change the conductivity type back to that which it originally was. This may be the same impurity as was added in the beginning or a different impurity having the same effect upon the conductivity of the crystal to be grown. Since the amount of this impurity is usually considerably greater than what was previously added, the resistivity of the last part of the crystal to be grown is generally much lower. In a typical silicon crystal antimony is used as the first impurity, aluminum as the second, and arsenic as the third, to produce an n-p-n type of crystal.

When the bars are cut from the grown crystal, the portion having the greatest amount of impurity, and therefore having the lowest resistivity, is generally used as the emitter portion of the transistor; the thin intermediate layer is used as the base portion and the first-grown, higher resistivity portion of the bar is used as the collector.

The result of this arrangement is to form an emitter-to-base portion of the transistor that has a relatively low resistance in the forward direction, and at the same time one that will not stand a very high voltage in the reverse direction without breaking down. In the base-to-collector portion, however, there is considerable more resistance because the resistivity of the collector portion of the transistor bar is much higher. At the same time, this part of the transistor bar will withstand a much higher back voltage without breakdown. While it is desirable that the base-to-collector junction be able to withstand a high back voltage without breakdown, it is undesirable that large power losses be encountered in this part of the circuit because of the relatively high resistivity of the collector portion of the bar.

Prior to this invention, attempts have been made to overcome this difficulty by increasing the amount of impurity in the collector portion of the bar, thus lowering its resistivity; by making the connection to the collector segment close to the base layer; or by bridging a portion of the collector section of the transistor bar with a highly conductive material.

When the resistivity of the entire collector section of the transistor bar is lowered, the ability of the base-collector junction to stand back voltage is materially impaired, and although the other two methods tend to avoid this and do reduce the power losses due to high resistivity of the bulk of the collector segment, they are somewhat expensive and difficult to accomplish in practice.

According to the present invention, the crystals from which the transistor bars are to be cut are so grown as to avoid the power losses due to high collector section resistivity, while at the same time providing for an adequate back voltage characteristic for the ultimate base-collector junction. In brief, this is accomplished by so growing the semiconductor crystal that the collector section of the ultimate transistor bar will have a low resistivity except for a narrow layer immediately adjacent the base layer of the transistor bar. This narrow layer is grown so as to have a considerably higher resistivity and this, it has been found, will maintain the back voltage breakdown at a satisfactory level without causing large power losses.

Further details and advantages of this invention will be apparent from the following detailed description of the preferred embodiment of this invention and from the drawing illustrative thereof.

In the drawing, the single figure is a side view of the center portion of a silicon transistor bar, on a greatly enlarged scale and with a graphic showing immediately thereabove indicating the impurity concentrations as they change longitudinally of the bar.

Illustrated in the drawing is a portion of a silicon transistor bar 11. This bar was grown from left to right, that is, the portion 12 at the left side of the drawing was grown first; and then a certain amount of added impurity was placed in the melt and the next portion 13 was grown; and then still more impurity was placed in the melt and the portion 14 was grown; and, finally, after the addition of still further impurity, the portion 15 was grown.

In the beginning, the melt contained silicon and about $5\times10^{16}$ atoms of antimony per cubic centimeter of silicon. This is indicated by section 16 of the graphic illustration. At point 17, which is the point at which the growth of the higher resistivity portion of the collector was started, enough aluminum was added to the melt to offset all but about $4\times10^{15}$ atoms of antimony per cubic centimeter of silicon. This change took place at a distance of approximately 8 mils (.008 inch) before the next addition of impurity, which caused the formation of the collector-base junction.

The collector-base junction was caused by the addition to the melt of an excess of aluminum sufficient to neutralize the effect of all of the antimony and provide an excess of aluminum to the extent of approximately $3\times10^{16}$ atoms of aluminum per cubic centimeter of melt. This is indicated by the portion of the curve marked 19. A base layer approximately 1 mil (.001 inch) thick was then grown, and thereafter a relatively large amount of arsenic was added to completely neutralize the effect of the aluminum and provide an excess of arsenic of about $1\times10^{19}$ atoms per cubic centimeter of melt. The emitter portion of the crystal was then grown from this mixture. This is shown in the diagram as the portion of the curve 20.

The result of this method of growing the crystal for the transistor was to form a segment 12 of a quite low resistivity (about 0.2 ohm cm.); a second portion 13 of a considerably higher resistivity (about 1.5 ohm cm.); then a base layer 14; and finally an emitter layer 15 having a very low resistivity.

It will immediately be apparent that other n-type conductivity-inducing impurities than antimony and arsenic may be used, and other p-type conductivity-inducing impurities than aluminum. It will also be apparent that germanium or other semiconductor material may be used instead of silicon. These equivalents are all well known in the art. It will also be apparent that the specific amounts of impurities used can be varied within reasonable limits. Also, the principles of this invention may be applied to p-n-p crystal formation as well as to the n-p-n type.

Transistors made in accordance with the principles of this invention exhibit unusually good characteristics insofar as reverse voltage breakdown is concerned, and at the same time show greatly reduced power losses over those prepared by conventional methods.

What is claimed is:

1. A grown junction transistor bar having a collector segment of relatively low resistivity, a second collector segment adjacent thereto of the order of .006 to .010 inch in thickness and of a relatively high resistivity, a thin base layer adjacent said second collector segment and an emitter segment adjacent the base segment.

2. A grown junction transistor bar having a collector segment of a resistivity of around 0.2 ohm cm., a second collector segment adjacent thereto of the order of .006 to .010 inch in thickness and of a resistivity of around 1.5 ohm cm., a thin base layer adjacent said second collector segment and an emitter segment adjacent the base segment.

3. A grown junction silicon transistor bar having a collector segment of relatively low resistivity, a second collector segment adjacent thereto of the order of .006 to .010 inch in thickness and of a relatively high resistivity, a thin base layer adjacent said second collector segment and an emitter segment adjacent the base segment.

4. A grown junction silicon transistor bar having a collector segment of a resistivity of around 0.2 ohm cm., a second collector segment adjacent thereto of the order of .006 to .010 inch in thickness and of a resistivity of around 1.5 ohm cm., a thin base layer adjacent said second collector segment and an emitter segment adjacent the base segment.

References Cited in the file of this patent

UNITED STATES PATENTS

| | | |
|---|---|---|
| 2,623,105 | Shockley | Dec. 23, 1952 |
| 2,767,358 | Early | Oct. 16, 1956 |
| 2,790,037 | Shockley | Apr. 23, 1957 |
| 2,790,940 | Prince | Apr. 30, 1957 |